US008216330B2

(12) United States Patent
Moredock et al.

(10) Patent No.: US 8,216,330 B2
(45) Date of Patent: *Jul. 10, 2012

(54) POWERED AIR CLEANING SYSTEM AND AIR CLEANING METHOD

(75) Inventors: James G. Moredock, Neptune Beach, FL (US); Eric L. Ehrenberg, Jacksonville, FL (US)

(73) Assignee: The Sy-Klone Company, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/193,835

(22) Filed: Jul. 29, 2011

(65) Prior Publication Data

US 2012/0000356 A1 Jan. 5, 2012

Related U.S. Application Data

(62) Division of application No. 11/877,036, filed on Oct. 23, 2007, now Pat. No. 8,007,565.

(51) Int. Cl.
*B01D 45/12* (2006.01)
(52) U.S. Cl. ............... 55/406; 55/396; 55/416; 55/471; 55/472; 95/1; 95/25; 95/270; 96/417
(58) Field of Classification Search .............. 55/345, 55/413, 414, 416, 396, 406, 407; 95/1, 19, 95/23, 267, 268, 270, 271, 273; 96/417
See application file for complete search history.

(56) References Cited

U.S. PATENT DOCUMENTS

| 1,746,218 | A | 2/1930 | Kamrath |
| 1,756,909 | A | 4/1930 | Cram |

(Continued)

FOREIGN PATENT DOCUMENTS

DE 10-2004-035 688 3/2005

(Continued)

OTHER PUBLICATIONS

Supplementary European Search Report, EP 08843150.7 (PCT/US2008/011095), Feb. 23, 2011.

(Continued)

*Primary Examiner* — Duane Smith
*Assistant Examiner* — Sonji Turner
(74) *Attorney, Agent, or Firm* — Antonelli, Terry, Stout & Kraus, LLP.

(57) ABSTRACT

A powered air cleaning system has a flow path extending through the system from an inlet to an outlet. A motor-driven fan is located along the flow path to draw particulate debris laden air into the inlet and rotate it about an axis to form a rotating flow that stratifies the debris laden air with the heaviest particles in the outermost orbits of the rotating flow. An ejector port ejects particulate debris laden air from the stratified rotating flow in the system. At least one de-swirl component located within the rotating flow aerodynamically redirects clean air from the innermost orbits of the stratified rotating flow toward the outlet to provide a positive airflow pressure out of the outlet. The system has a variable speed fan motor and an integrated controller for adjusting the speed of the motor and thereby the flow rate of clean air through the outlet of the system. The controller receives a signal that is a function of airflow requirements of a device supplied with clean air by the system. The system can be mounted above or below a hood housing an engine to be supplied with clean air.

4 Claims, 15 Drawing Sheets

U.S. PATENT DOCUMENTS

Figure 2:
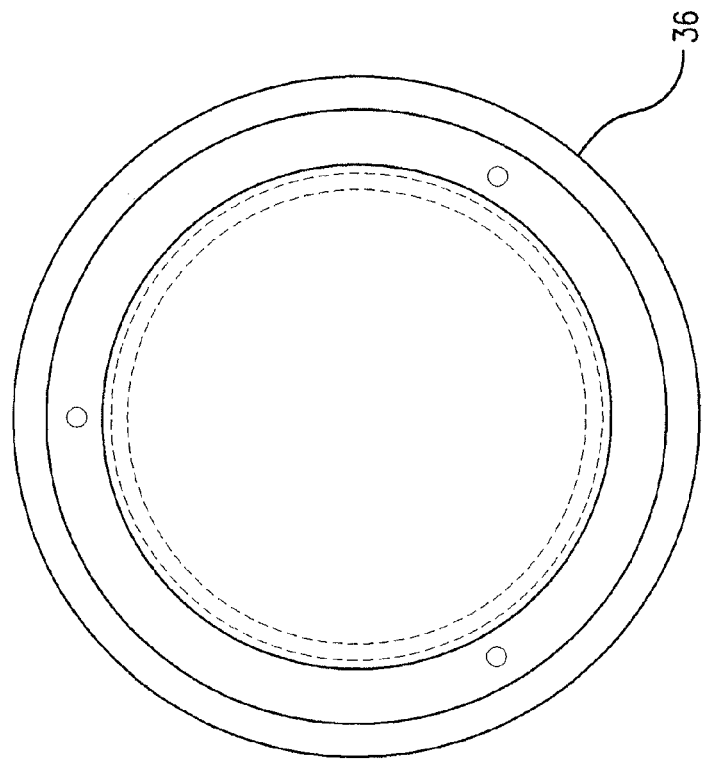
Figure 3:
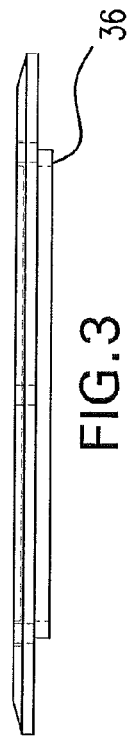

| | | | |
|---|---|---|---|
| 2,378,506 A | 6/1945 | Sebok | |
| 2,506,298 A | 5/1950 | Griffen | |
| 2,895,296 A | 7/1959 | Hryniszak | |
| 3,258,895 A | 7/1966 | Wiebe at al. | |
| 3,362,155 A | 1/1968 | Driscoll | |
| 3,444,672 A | 5/1969 | Alsobrooks | |
| 4,158,449 A | 6/1979 | Sun et al. | |
| 4,323,369 A | 4/1982 | Monson et al. | |
| 4,512,152 A | 4/1985 | Asaba | |
| 4,881,957 A | 11/1989 | Shofner | |
| 5,591,008 A | 1/1997 | Wrobel et al. | |
| 5,656,050 A | 8/1997 | Moredock | |
| 5,766,315 A | 6/1998 | Moredock | |
| 6,319,304 B1 | 11/2001 | Moredock | |
| 6,338,745 B1 | 1/2002 | Moredock et al. | |
| 6,406,506 B1 | 6/2002 | Moredock et al. | |
| 6,425,943 B1 | 7/2002 | Moredock | |
| 6,878,189 B2 | 4/2005 | Moredock | |
| 7,056,368 B2 | 6/2006 | Moredock et al. | |
| 7,258,727 B2 | 8/2007 | Greif et al. | |
| 8,007,565 B2 * | 8/2011 | Moredock | 95/1 |
| 2004/0216611 A1 | 11/2004 | Moredock | |
| 2004/0231515 A1 | 11/2004 | Moredock et al. | |
| 2005/0172587 A1 | 8/2005 | Moredock et al. | |
| 2006/0048761 A1 | 3/2006 | Ekeroth et al. | |
| 2007/0173188 A1 | 7/2007 | Moredock et al. | |
| 2009/0101013 A1 * | 4/2009 | Moredock | 95/269 |

FOREIGN PATENT DOCUMENTS

FR 1069071 7/1954

OTHER PUBLICATIONS

International Search Report and Written Opinion mailed Dec. 10, 2008, in International Application No. PCT/US08/011095; International Filing Date: Sep. 25, 2008, 15 pages.

International Preliminary Examination Report mailed Aug. 13, 2010, in International Application No. PCT/US08/011095; International Filing Date: Sep. 25, 2008, 11 pages.

* cited by examiner

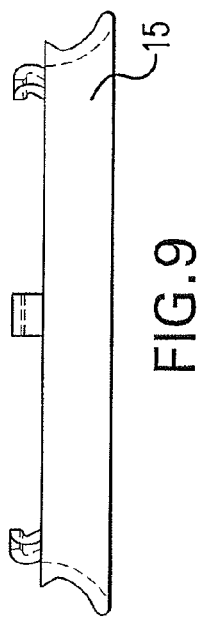
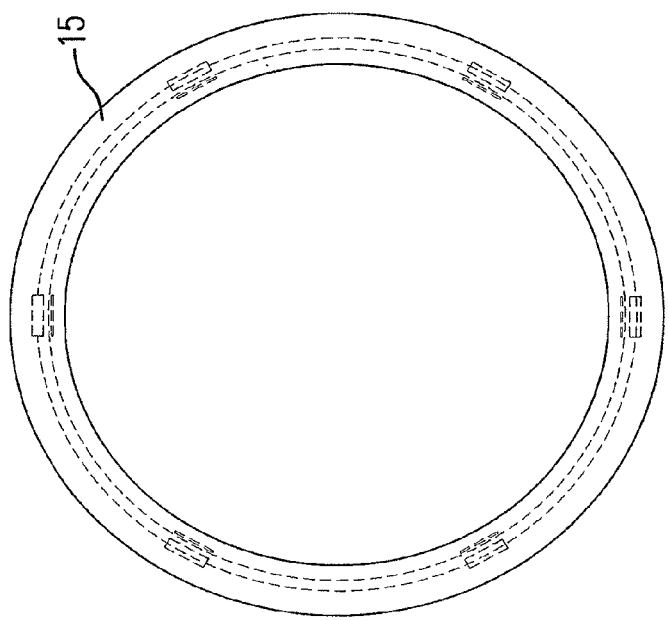
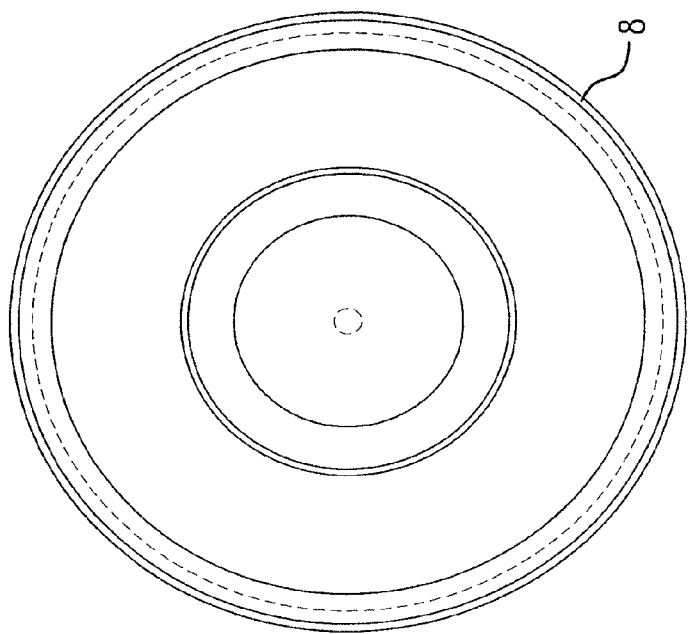
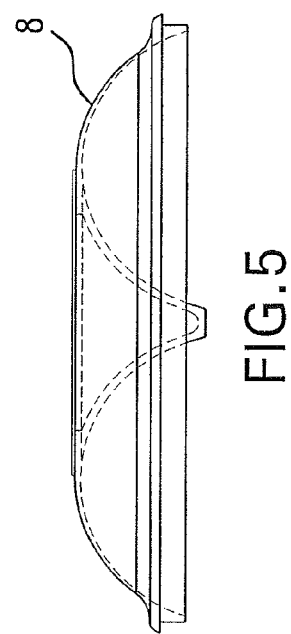

POWERED AIR CLEANING SYSTEM AND AIR CLEANING METHOD

RELATED APPLICATION

This application is a divisional application of U.S. application Ser. No. 11/877,036, filed Oct. 23, 2007, now U.S. Pat. No. 8,007,565 issued Aug. 30, 2011, the disclosure of which is hereby incorporated by reference.

TECHNICAL FIELD

The present invention is directed to an improved powered, atmospheric ejective, air cleaning system and air cleaning method for efficiently removing debris from debris laden air to supply clean air to a device with which the system is used based on the airflow requirements of the device. For example, the invention is useful in connection with total airflow applications such as ventilation systems, as a fixed airflow provider for heat exchangers and heating and air conditioning systems, and with devices having a variable airflow demand, particularly internal combustion engines which exert a variable vacuum on their air intake to be supplied with clean air.

BACKGROUND AND SUMMARY

Air intakes that centrifugally separate heavier-than-air particles from the air to be used in internal combustion engines, ventilation systems, and other apparatus that draw in air laden with debris, are known. The use of in-line filters in air delivery systems to clean the air is also, per se, known. However, air filters are subject to plugging by debris from the air passing through the filter, which eventually increases the restriction to airflow through the filter and decreases the operating performance of an associated device, such as an electronically controlled internal combustion engine being supplied with air through the filter. Frequent filter replacement and shorter service intervals may also be required, which increases the cost of operation.

Examples of assignee's prior powered air cleaning systems and air cleaning methods are shown in U.S. Pat. Nos. 7,056, 368; 6,425,943; 6,406,506; 6,338,745 and 6,319,304. The motors of the motor-driven fans in these known powered air cleaning systems are run at a single rated speed, around 3200 rpm. The clean airflow rate from such a system operating at this single rated speed must satisfy the maximum airflow requirement of the device being supplied with clean air by the system. When the airflow requirement of a device is reduced to less than the maximum airflow requirement, there is an inefficiency in that the air cleaning system continues to operate to satisfy the maximum airflow requirement of the device. Thus, there is excess airflow provided by the system which flows through the system to atmosphere with the debris laden air through the ejector port(s) in the separator ejector chamber(s) of the system.

The powered air cleaning system of U.S. Pat. No. 7,056, 368 is operated to maintain a positive pressure in the separator-ejector chamber upstream of a filter in the system, but only provides an essentially neutral pressure at the clean air outlet of the system through which clean air is provided to a device such as an engine or ventilation system. The device itself may have an air filter through which the incoming clean air from the system is passed. The air filter of the device is also subject to plugging by any debris remaining in the clean air from the system and requires periodic replacement. An improved powered air cleaning system and air cleaning method having greater operational efficiency and higher performance in air cleaning and in relation to the operation of a device downstream of the system, capable of efficiently meeting varying airflow requirements of the device and increasing filter change intervals for filters in the device downstream of the system, are needed.

For this purpose, a powered air cleaning system of the present invention comprises a flow path extending through the system from an inlet to an outlet, a motor-driven fan located along the flow path to draw particulate debris laden air into the inlet and rotate it about an axis to form a rotating flow that stratifies the debris laden air with the heaviest particles in the outermost orbits of the rotating flow, an ejector port for ejecting particulate debris laden air from the stratified rotating flow in the system, and at least one de-swirl blade located within the rotating flow for aerodynamically redirecting clean air from the innermost orbits of the stratified rotating flow toward the outlet. This results in straightening out the airflow thereby adding additional pressure out of the clean air outlet of the system into the air inlet of the device downstream of the system. The use of additional pressure is useful in overcoming the air inlet restriction in the downstream device and is effective to increase filter change intervals for filters in the downstream device. In a disclosed embodiment, a plurality of de-swirl blades are provided centered in the outlet of the system for aerodynamically redirecting clean air from the innermost orbits of the stratified rotating flow toward the outlet.

According to a further feature of the improved powered air cleaning system, the motor-driven fan is a turbine-type fan with an impeller having a hub with blades thereon arranged in the flow path for rotation about an axis. The hub and the flow path at least in the area of the blades each have a progressively increasing diameter in the downstream direction of the flow path. In the preferred embodiment, the impeller is formed of an assembly of an injection molded blade component and an injection molded hub component. Features below the lower surface of blades on the blade component are formed on the hub component so that each component can be made using open and shut, two piece injection mold tooling.

The motor of the motor-driven fan is capable of rotating the fan at a speed on the order of 7,000 rpm. The motor is a variable speed motor which has an integrated motor controller for adjusting the speed of the motor and thereby the flow rate of clean air through the outlet of the system. In the case the outlet of the system is connected to an inlet of a device having variable airflow requirements, the air cleaning system further includes means for electronically signaling the controller as a function of the airflow requirements of the device for varying the speed of the motor and thereby the flow rate of clean air to the device in accordance with the airflow requirements.

The improved powered air cleaning system can be used to supply clean air to various devices, including, for example, a ventilation system and an internal combustion engine. Where the device is used on the air inlet of an internal combustion engine, the signals of the airflow requirements from the means for electronically signaling are based, for example, on at least the operating speed of the engine. With a ventilation system downstream of the powered air cleaning system, airflow requirements are electronically signaled by a pressurization switch (air pressure sensor) or filter differential pressure $\Delta P$ in the ventilation system.

Figure 12:
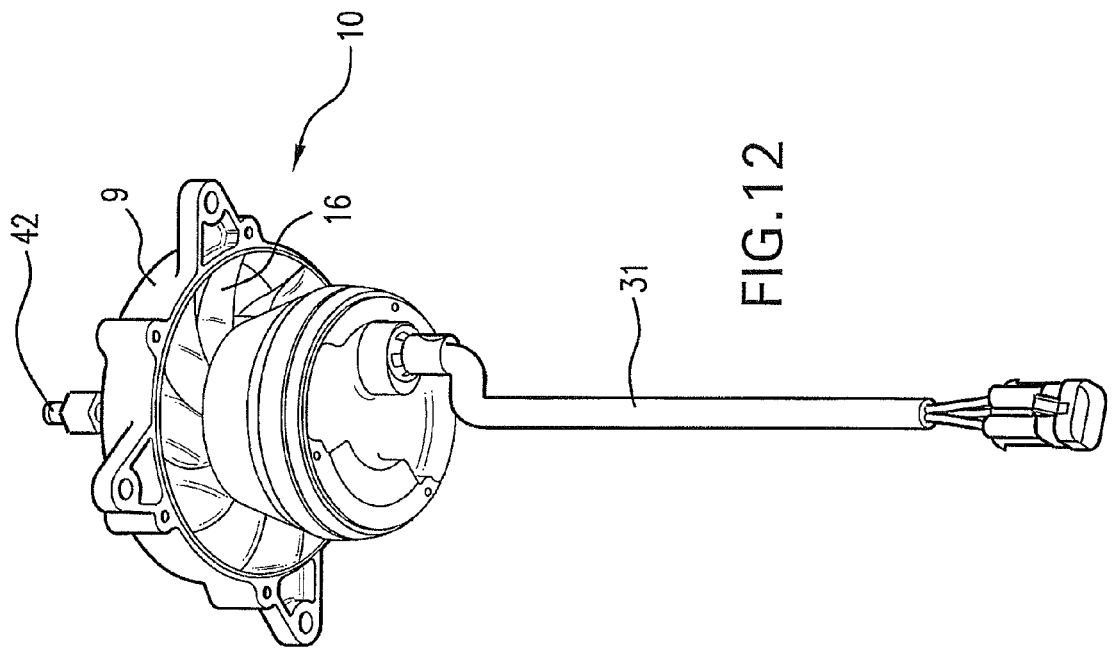
Figure 11:
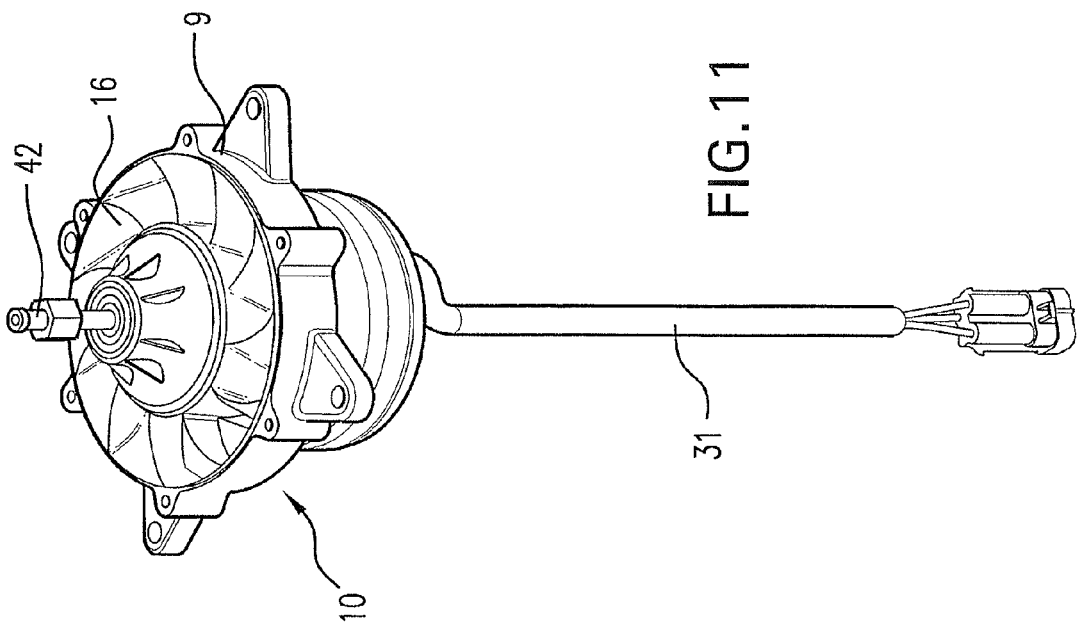
Figure 23:
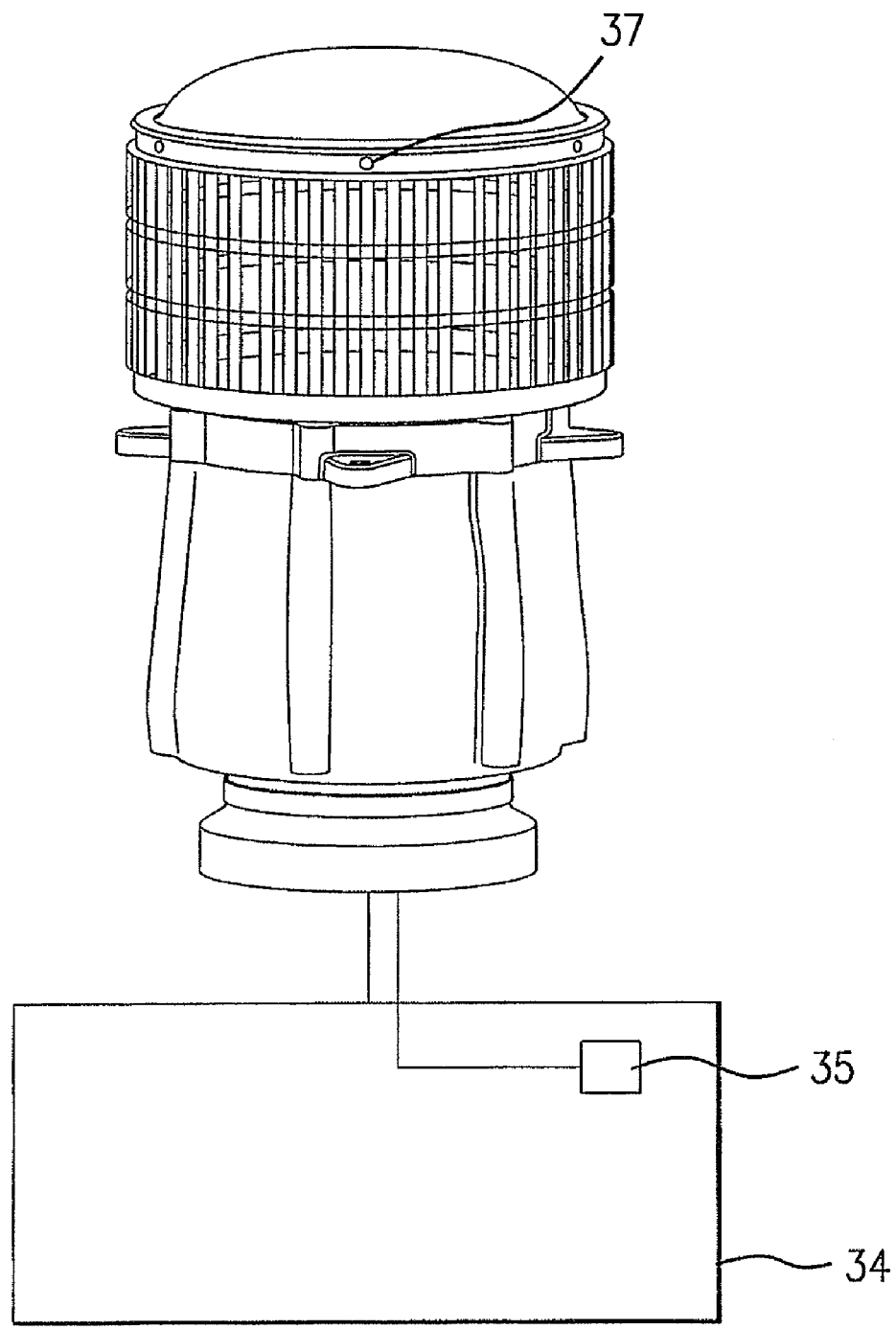

An air cleaning method according to the invention comprises drawing particulate debris laden air into an air cleaning system with a motor-driven fan located in the system, forming a rotating flow of the debris laden air about an axis in a separator-ejector chamber of the system to stratify the flow with the heaviest particles in the outermost orbits of the rotating flow, aerodynamically redirecting clean air from the innermost orbits of the stratified rotating flow toward an outlet to provide a positive airflow pressure out of the outlet, and returning particulate debris laden air from the stratified rotating flow in the system to the environment. The redirecting according to an example embodiment includes using de-swirl blades mounted in the separator-ejector chamber to aerodynamically redirect the airflow toward the outlet to provide the positive airflow pressure out of the outlet.

According to a further feature, the method includes varying the speed of the motor-driven fan and thereby the flow rate of clean air through the outlet of the system as a function of the airflow requirements of a device being supplied with clean air by the system. Varying the speed includes sending an electronic signal from the device to the controller in the system which adjusts the speed of the motor-driven fan.

These and other features and advantages of the invention will become more apparent from the following detailed description of an example embodiment taken with the accompanying drawings.

BRIEF DESCRIPTION OF DRAWINGS

FIG. 1 is a side view, partially cut away, of a powered air cleaning system according to an example embodiment of the invention schematically illustrating the flow path of particulate debris laden air into the system, the centrifugal separation of particulate debris laden air within the system from clean air and showing the exiting of clean air from a system outlet and the exiting of particulate debris laden air from an ejector port in the system.

FIG. 2 is a view from above a top cap of the system of FIG. 1.

FIG. 3 is a side view of the top cap of FIG. 2.

FIG. 4 is a top view of a rain cap of the system of FIG. 1.

FIG. 5 is a side view of the rain cap of FIG. 4.

FIG. 6A is a view from outside and above a screening component used with other like screening components to form annular screening at the inlet of the system of FIG. 1.

FIG. 6B is a view from the inside and above of the screening component of FIG. 6A.

FIG. 7 is a perspective view from the side and above of the inlet of the system of FIG. 1 which forms a shroud around the fan blades of a motor-driven fan of the system.

FIG. 8 shows the inlet of FIG. 7 from below and to one side.

FIG. 9 is a side view of an inlet cap of the inlet of FIG. 7.

FIG. 10 is a bottom view of the inlet cap of FIG. 9.

FIG. 11 is a view from the side and above of the motor controller assembly of the powered air cleaning system of FIG. 1.

FIG. 12 is a view from the side and below of the motor controller assembly of FIG. 11.

FIG. 13 is a view from the side of a one piece impeller which may be used in the motor-driven fan of the air cleaning system of FIG. 1, with undercut features below the lower surface of blades on the impeller being shown bounded by lines for explanation of the construction of the injection molded, two piece impeller of FIG. 14 which is preferably employed in the motor-driven fan of the system of FIG. 1.

FIG. 14 is a side view of an injection molded, two piece impeller for use in the motor-driven fan of the system of FIG. 1, a hub component and a blade component of the impeller being shown disassembled.

FIG. 15 is a view from the side of the motor-controller assembly, shown in disassembled relation, of the air cleaning system of FIG. 1.

FIG. 16 is a view from the side and above of the separator-ejector chamber of the system of FIG. 1.

FIG. 17 is a view from the side and below the chamber of FIG. 16.

FIG. 18 is a view from the side and above of the protruding end with de-swirl blades of a de-swirl cap of the system of FIG. 1.

FIG. 19 is a view from the side and below of the de-swirl cap of FIG. 18.

FIG. 20 is a view from the side and above of a separator-ejector chamber outlet and ejector port of the system of FIG. 1.

FIG. 21 is a view from the side and below of the outlet and ejector port of FIG. 20.

FIG. 22 is a side view of the system of FIG. 1 with the components thereof being shown disassembled along a longitudinal central axis of the system.

FIG. 23 is a side view of the system of FIG. 1, not partially cut away as in FIG. 1, in combination with a schematically illustrated device having an air inlet which is connected to the clean air outlet of the system and is being supplied with clean air from the outlet of the system and schematically showing a sensor/controller in the device for electronically signaling the controller in the system in accordance with the airflow requirements of the device for adjusting the fan motor speed and flow rate of clean air from the outlet of the system to the device to meet the airflow requirements.

FIG. 24 is a side view of a variation of the system of FIG. 1 wherein the ejector port is in the side wall of the separator-ejector chamber and in the form of an axially directed slot.

FIG. 25 is a side view of a further variation of the system of FIG. 1 wherein a round ejector port is connected to a conduit.

FIG. 26 is a view from the side and above of a powered air cleaning system according to the invention for use under the hood over an engine in a machine/vehicle.

FIG. 27 is a view from the side and below of a powered air cleaning arrangement according to the invention employing two systems like that in FIG. 1 arranged to supply clean air to a common downstream device having an air inlet.

DETAILED DESCRIPTION

Referring now to the drawings, the powered air cleaning system 1 comprises a flow path shown by the arrows B, B' and B" in FIG. 1 extending through the system from an inlet 2 to an outlet 3. A motor-driven, turbine-type fan 4 is located along the flow path to draw particulate debris laden air into the inlet and rotate it about a longitudinal axis A-A of the system to form a rotating flow that stratifies the debris laden air with the heaviest particles in the outermost orbits of the rotating flow. An ejector port 5 is provided for ejecting particulate debris laden air, B', from the stratified rotating flow in the system. A plurality of stationary de-swirl blades 6, concavely curved radially in a direction opposite the direction of the rotating flow in the system, are located within the rotating flow centered in the outlet 3 for aerodynamically redirecting clean air from the innermost orbits of the stratified rotating flow toward and through the outlet; see arrow B". This results in straightening out the airflow thereby adding additional pressure out of the clean air outlet and into an air inlet of a downstream device. The additional pressure overcomes inlet air restriction in the device and effectively increases filter change intervals for filters in the downstream device.

The powered air cleaning system 1 of the illustrated embodiment is equipped with an air inlet screen 7 and rain cap 8 with top cap 36 for an above-the-hood installation on a motor vehicle. The underside of the rain cap is designed to aerodynamically direct the airflow in a pattern into the inlet with the least amount of airflow turbulence. The rain cap is press fitted into the open top of the air inlet screen and secured to the air inlet screen with fasteners 37, for example screws or rivets as shown in FIG. 23. The screen in turn is connected to and supported by a center housing 9 of a motor controller assembly 10 of the system, see FIGS. 11 and 12.

Figure 1:
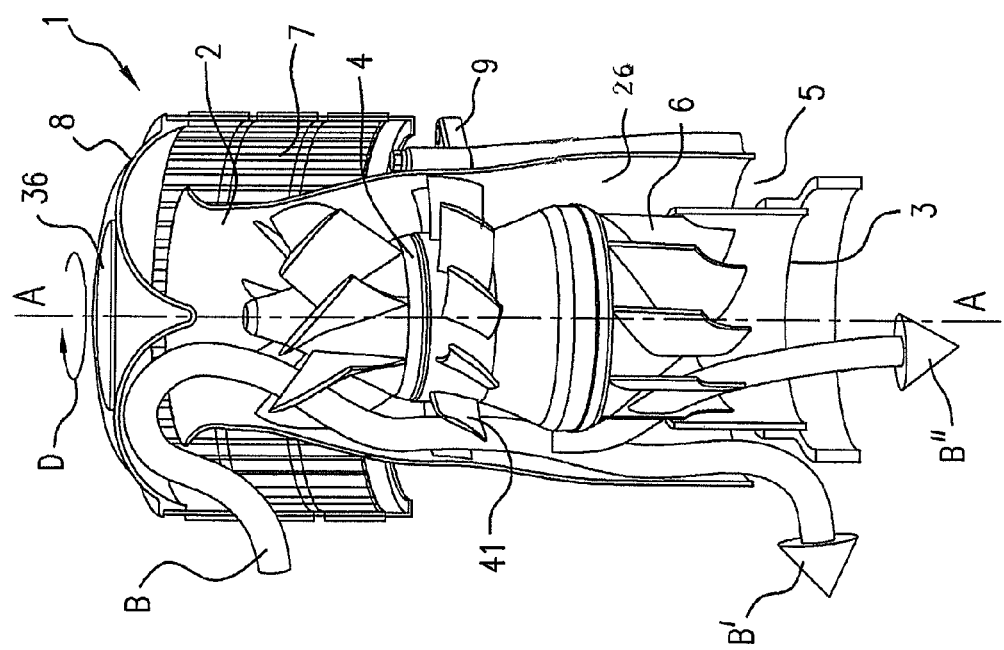
Figure 6B:
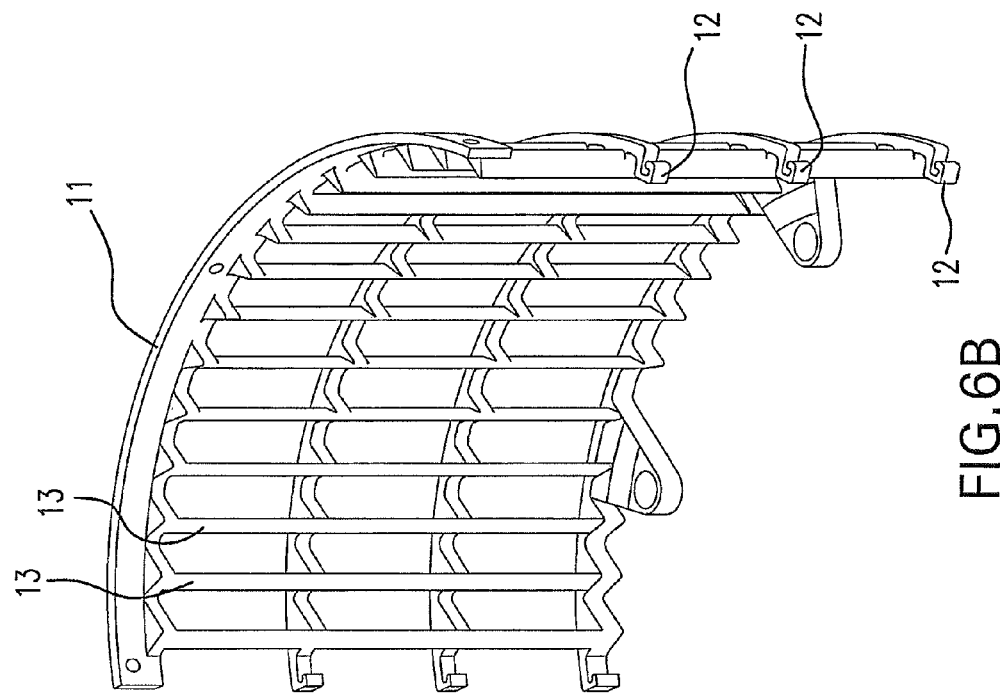
Figure 6A:
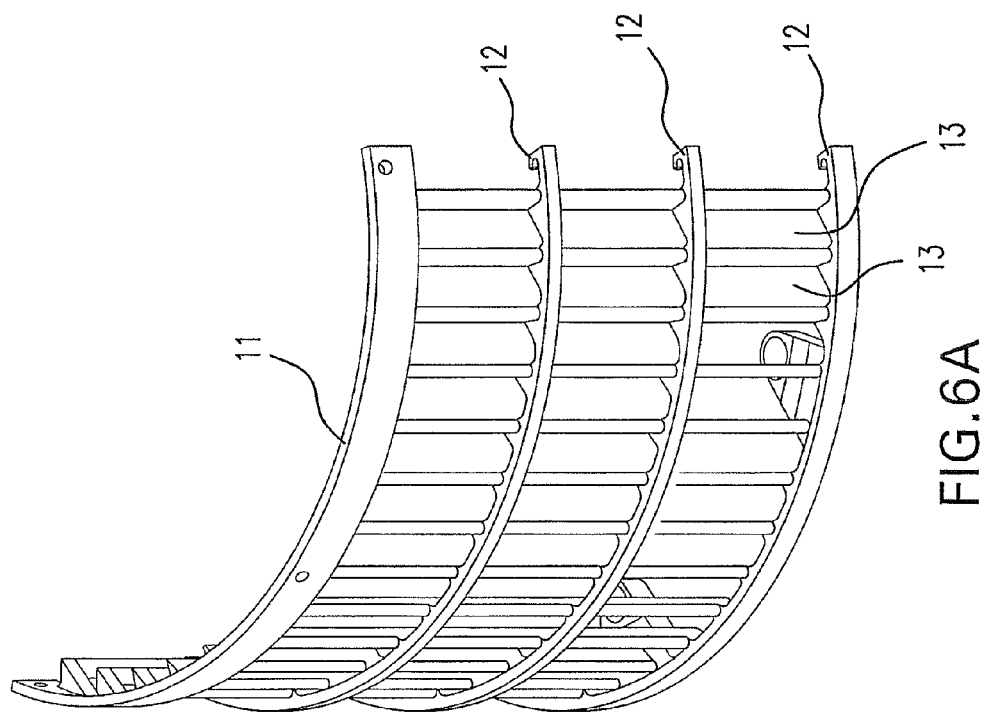

The air inlet screen 7 is formed of three molded sections 11, FIGS. 6A and 6B, that have connectors 12 on each end for connecting the sections together end to end to make the complete air inlet screen. The screen has spaced screen bars 13 with openings between the bars for incoming air. The screen bars are angled into the incoming airflow which makes the bars aerodynamically shaped and aligned to the airflow with the spinning pattern created by the turbine shaped fan blade 14 of the system. This allows the most efficient airflow path to start as the air begins to enter the air cleaning system. The screen 7 is open on the bottom as shown in FIG. 1 to permit heavier, slow moving particles to fall out before entering the powered separating system. This reduces debris build up on the screen.

Figure 8:
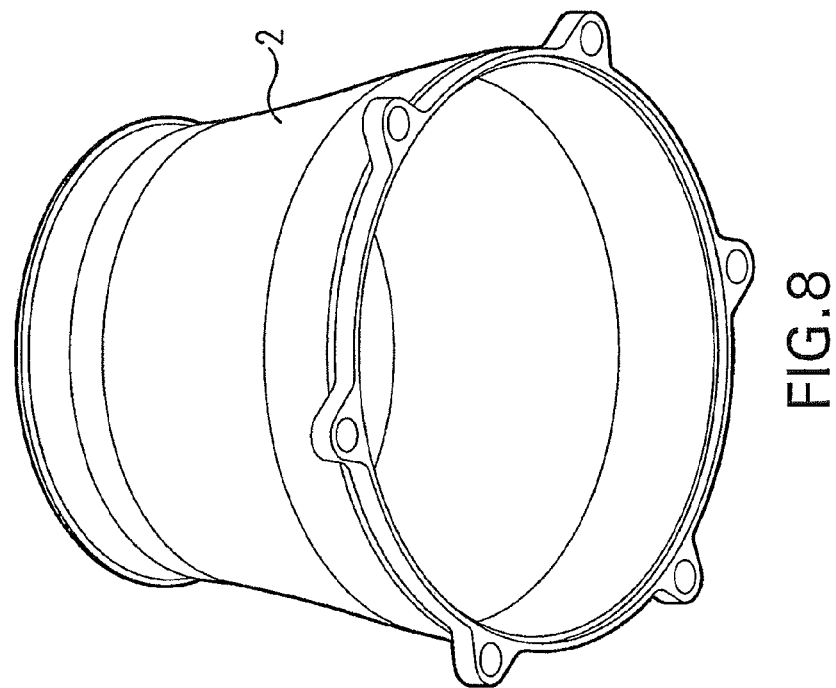
Figure 7:
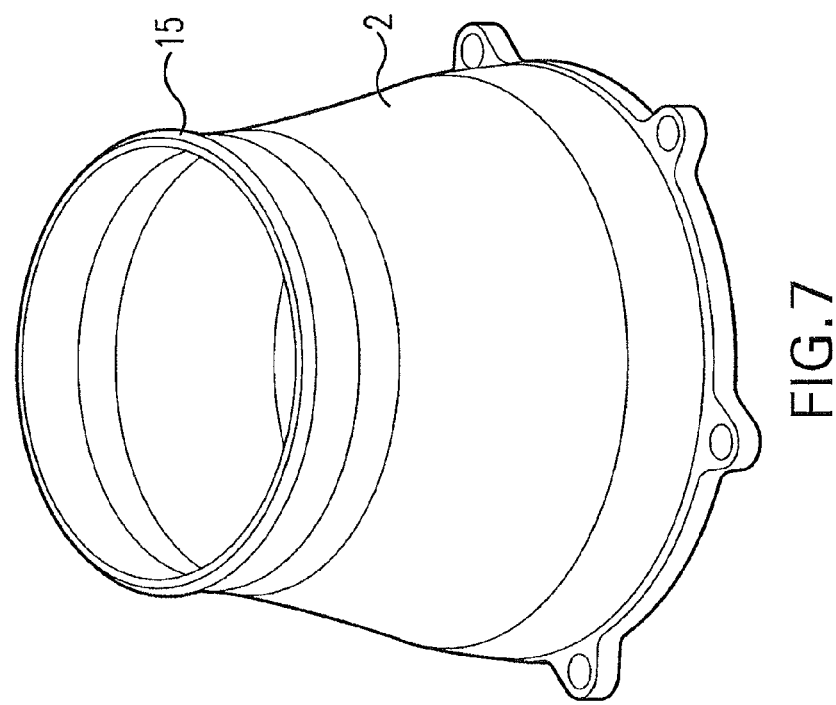
Figure 26:
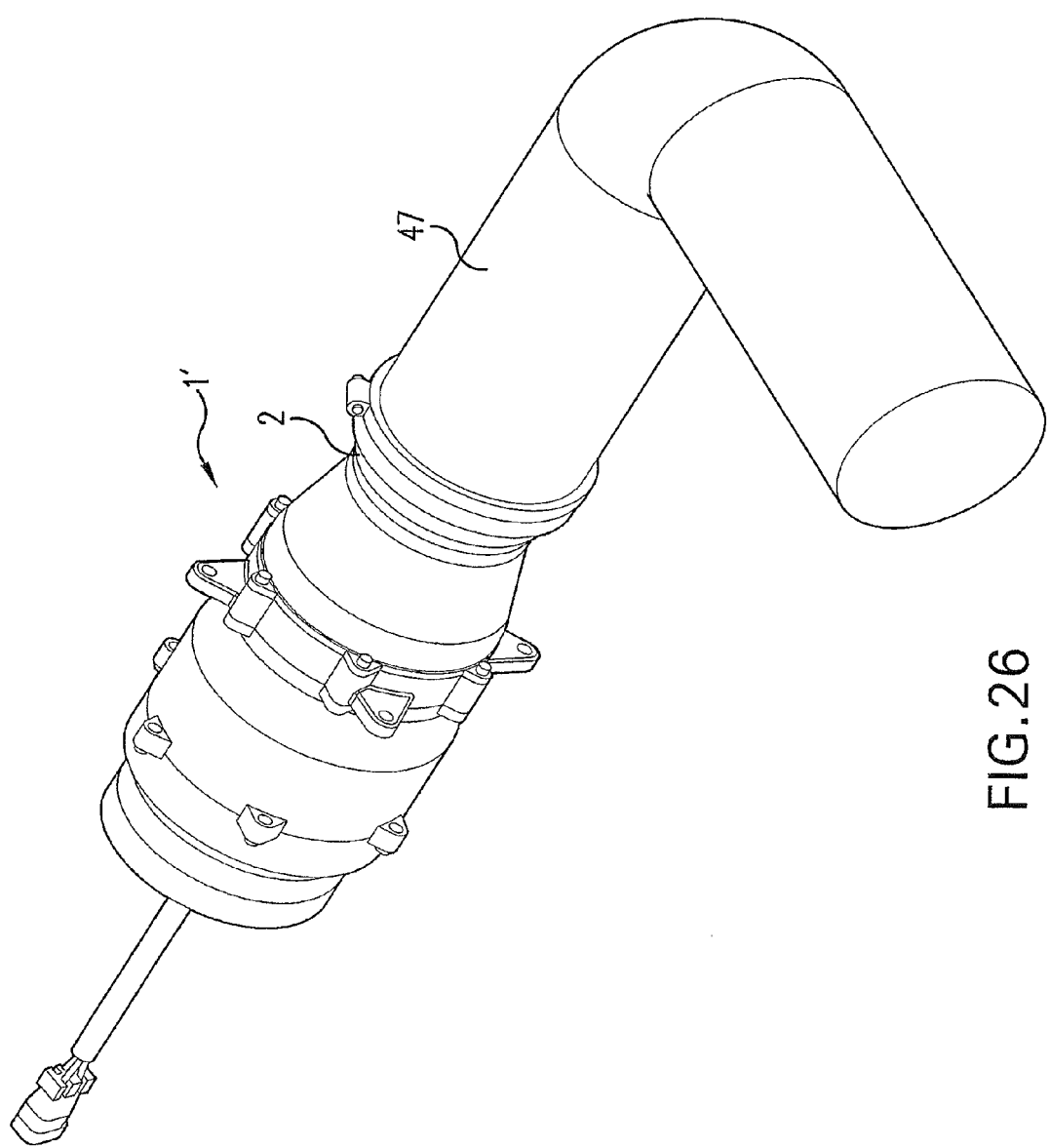

The inlet 2, FIGS. 7 and 8, is a two-piece snap together design with a positive latching mechanism that holds a special inlet cap 15, FIGS. 9 and 10, to the smaller, upstream end of the tapered inlet. The inlet cap reduces the air inlet loss as the air enters the inlet. The main body of the inlet 2 forms the shroud around the turbine type fan blade 14. When used under the hood of a vehicle, the special inlet cap 15 and the air inlet screen 7 with rain cap 8 and top cap 36 are not used thereby enabling additional air inlet piping to be installed to the air inlet making it an in-line design. FIG. 26, discussed below, shows an example of the powered air cleaning system 1' for use under the hood of a vehicle or machine. The inside diameter of the inlet 2 in the vicinity of the blades 18 on the turbine type fan blade 14 has a diameter which is progressively increased for moving air to a radially outer downstream compression assembly 16, FIGS. 1, 11 and 12.

Figure 14:
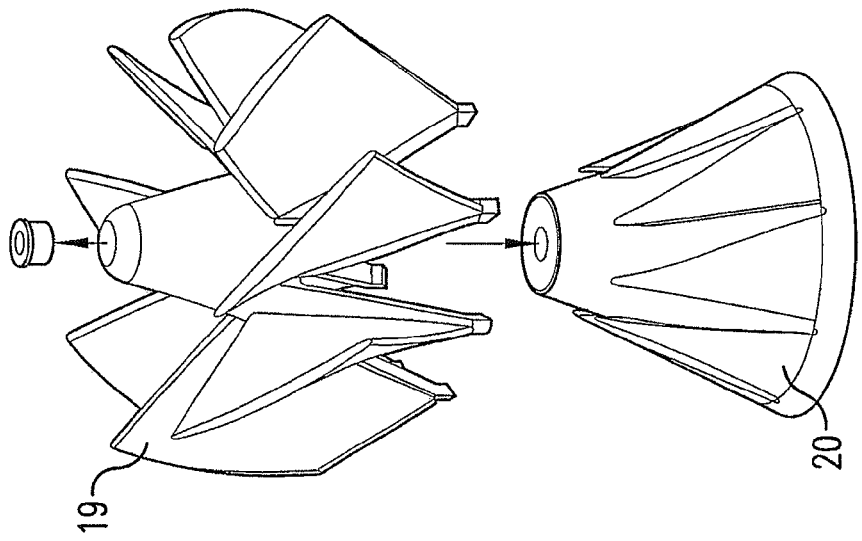
Figure 13:
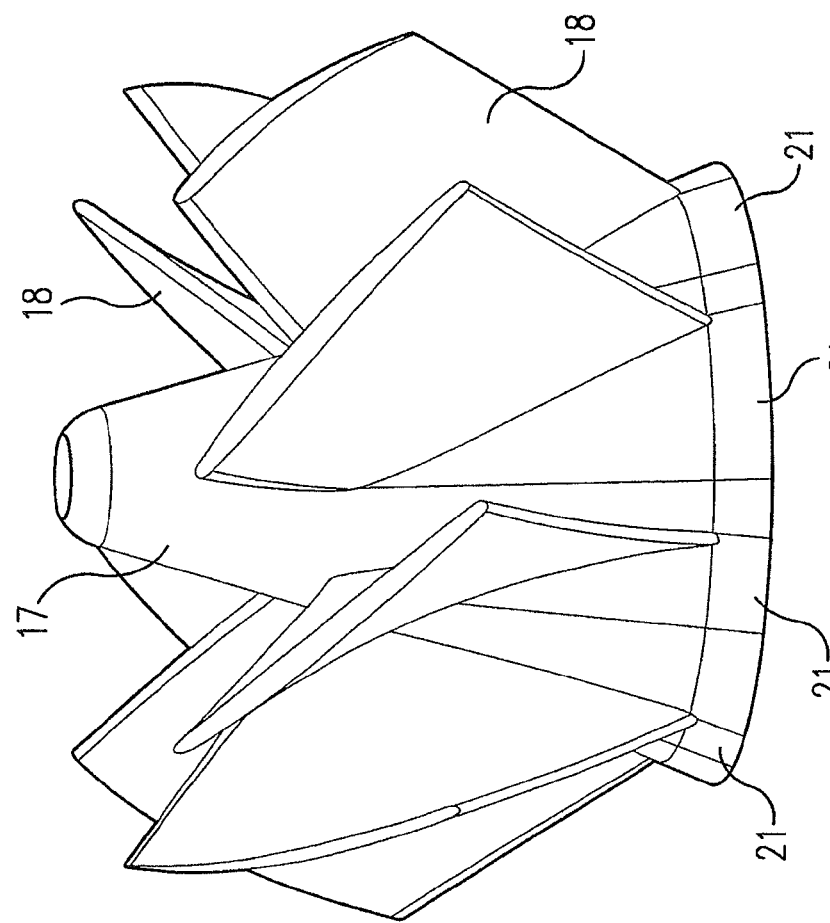
Figure 15:
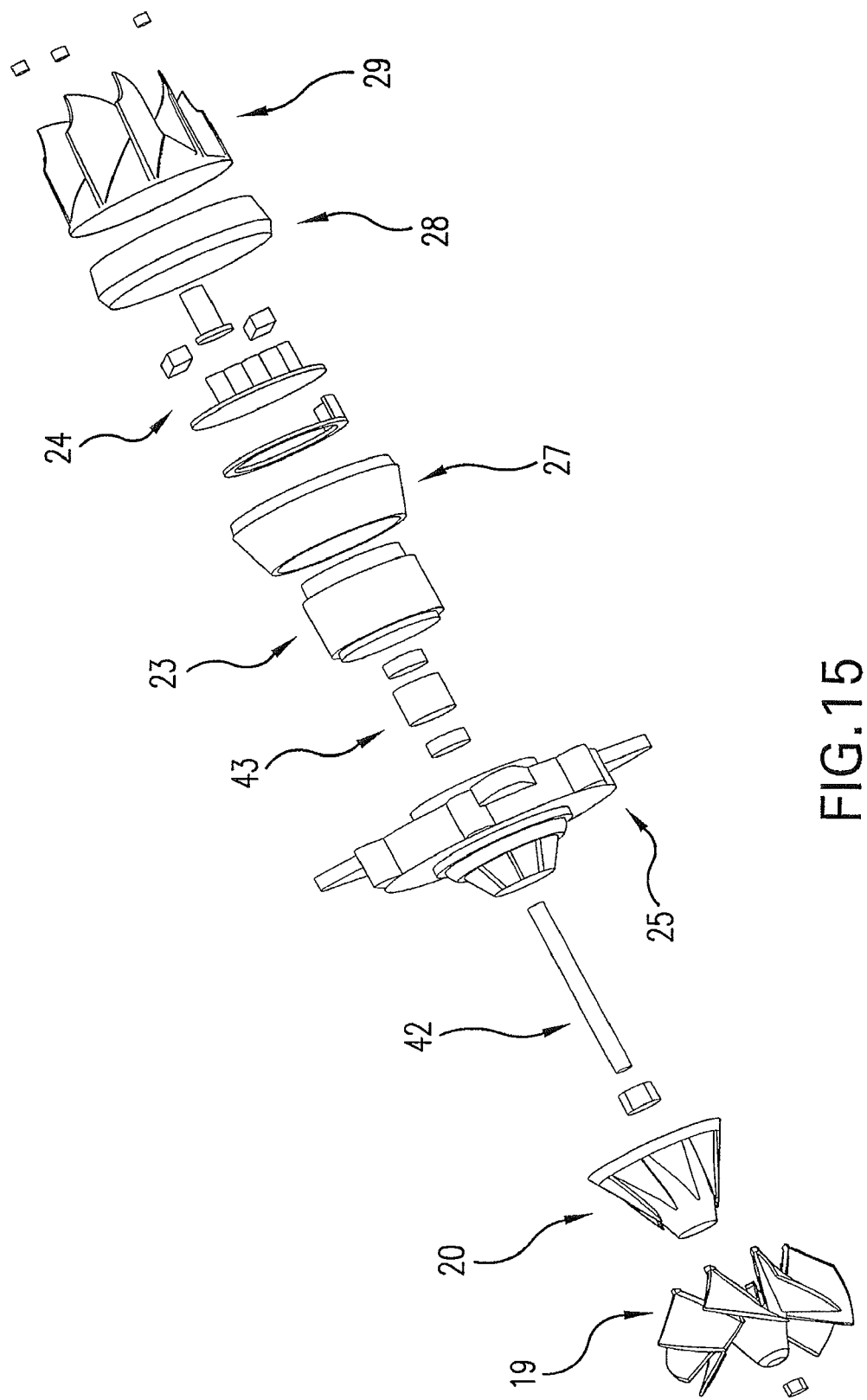

The turbine-type fan 4 has an impeller with a tapered hub 17 with blades 18 thereon arranged in the flow path for rotation about axis A-A. The tapered hub has a diameter which is progressively increased along the axis A-A in the downstream direction. As depicted in FIGS. 13 and 14, the impeller is preferably formed of an assembly of an injection molded blade component 19 and an injection molded hub component 20, FIG. 14. Features 21 below the lower surface of blades on the blade component, represented by the dark areas 21 bounded by lines in FIG. 13, are formed on the hub component of the two-piece impeller instead of the blade component so that each component can be made using open and shut two-piece injection mold tooling. The turbine type fan blade, together with its high speed motor 23 referred to below, produces high levels of airflow in a very compact design. The air cleaning system 1 of the example embodiment produces flow rates of clean air from the system of up to 650 cubic feet per minute (cfm) from the compact system which has an outer diameter of only 9.18 inches and a length of 16.08 inches. The dimensions and flow rates could be other than these depending on the requirements of an application as well be readily apparent to the skilled artisan. The two-piece impeller is also advantageous in that it permits the blades to be modified for specific airflows without changing the entire impeller system.

The motor-driven fan 4 with turbine type fan blade 14 is part of a motor controller assembly 10 which includes a compact brushless motor 23 as noted above. The motor 23 is a variable speed motor capable of rotating the fan at a speed on the order of 7000 rpm. The motor has a rotor 42 mounted within a bearing assembly 43 in the motor and to which the impeller of the fan is connected. An integrated programmable controller 24 is also provided as part of the assembly 10 for adjusting the speed of the motor and thereby the flow rate of clean air through the outlet of the system. The variable speed motor allows variability of energy input to control fan speed and airflow while maintaining high separating efficiencies throughout its operating range. The controller 24 allows programming the controller for specific applications without the expense or complications of having an external controller which would require external mounting, wiring and connector. Further, the programmable controller allows airflow delivered from the system to match requirements of a device such as an engine or ventilation system being supplied with clean air from the system even when these requirements increase or decrease. Variability of the motor speed also enables reduction in overall required operational current and conservation of electrical energy. In the example embodiment the motor is a 24 volt dc brushless motor.

The controller 24 can be a programmed processor such as a microprocessor that calculates a desired operating speed of the motor-driven fan using an electronic signal from a sensor or controller in a downstream device being supplied with clean air from the system as discussed below. For example, the electronic controller of an internal combustion engine can be used to give an electronic signal to the programmed controlled 24 of the system 1 which allows the controller to determine the engine airflow requirement and adjust the rpm of the motor 23 to provide the required amount of airflow out of the system outlet 2 to feed the engine and maintain high separation efficiency. With a ventilation system being supplied with clean air by the system 1, an air pressure sensor in the ventilation system and/or a filter differential pressure $\Delta P$ for an air filter in the ventilation system can be used to signal the controller 24 of the airflow requirements of the ventilation system to vary the airflow out of the system outlet 3 provided to the ventilation system.

The motor controller assembly 10 includes a center housing 25, which forms a motor mount for the motor 23. A vane assembly of the compression assembly 16 is formed as part of the center housing. The vanes 41 of the compression assembly direct the airflow from the turbine type fan blade into a separator-ejector chamber 26 in the system. The center housing and compression assembly are formed of aluminum in the example embodiment and act as a heat sink to cool the brushless motor. Attached to the motor controller assembly is a controller housing 27 for the motor controller, a controller housing end cap 28, and a de-swirl end cap 29 with de-swirl blades 6 formed on a tapered de-swirl hub 38. An electrical cabling 31 that powers the motor controller and motor also exits through the back of the motor controller housing through an opening 39 in the center of the de-swirl hub.

Figure 17:
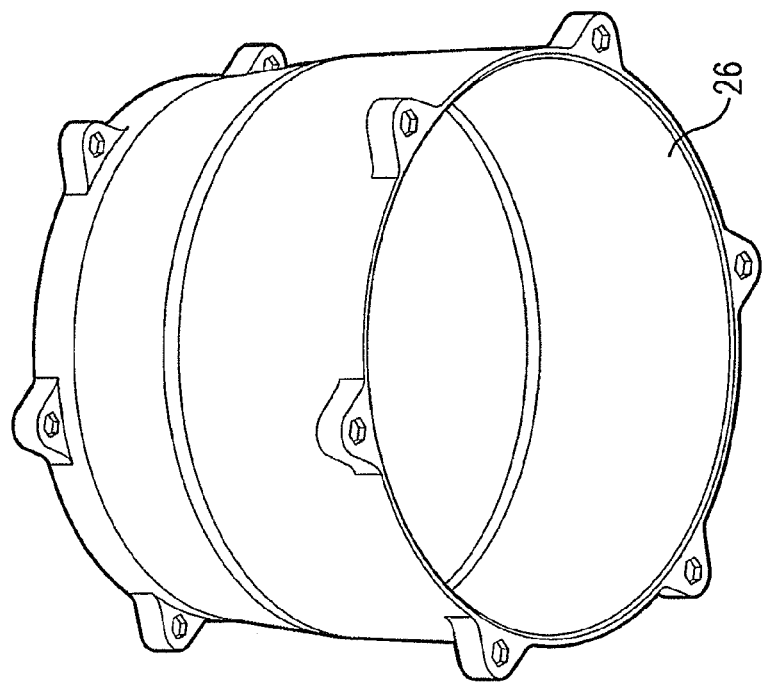
Figure 16:
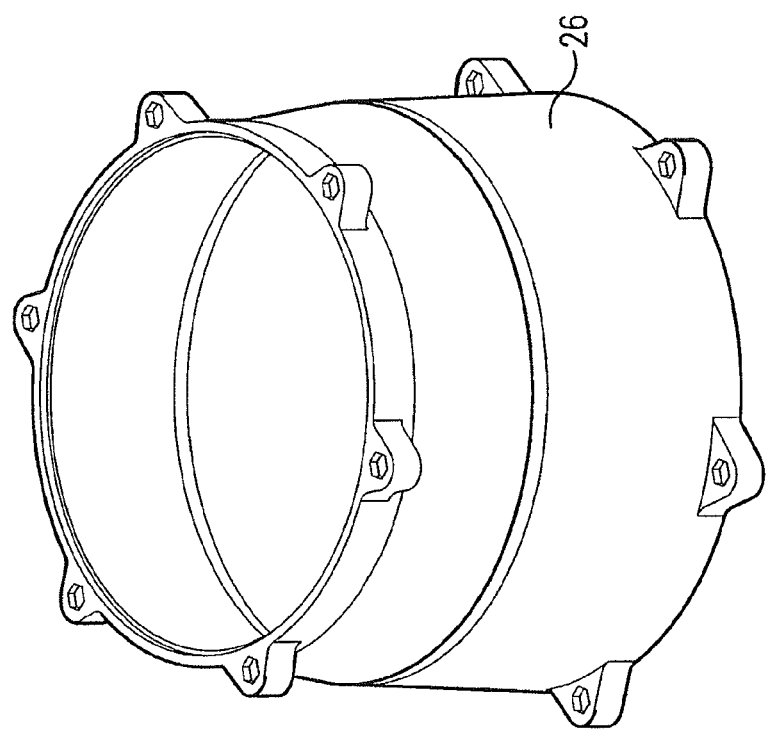
Figure 19:
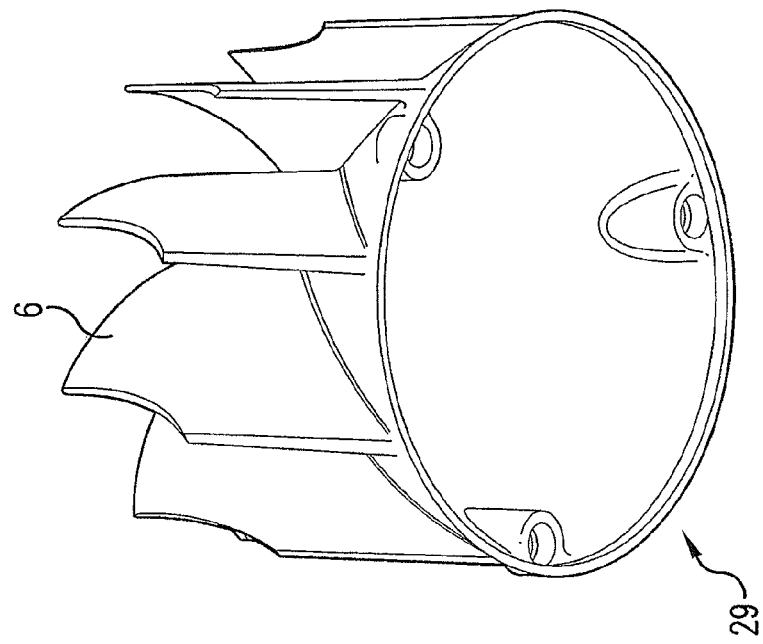
Figure 18:
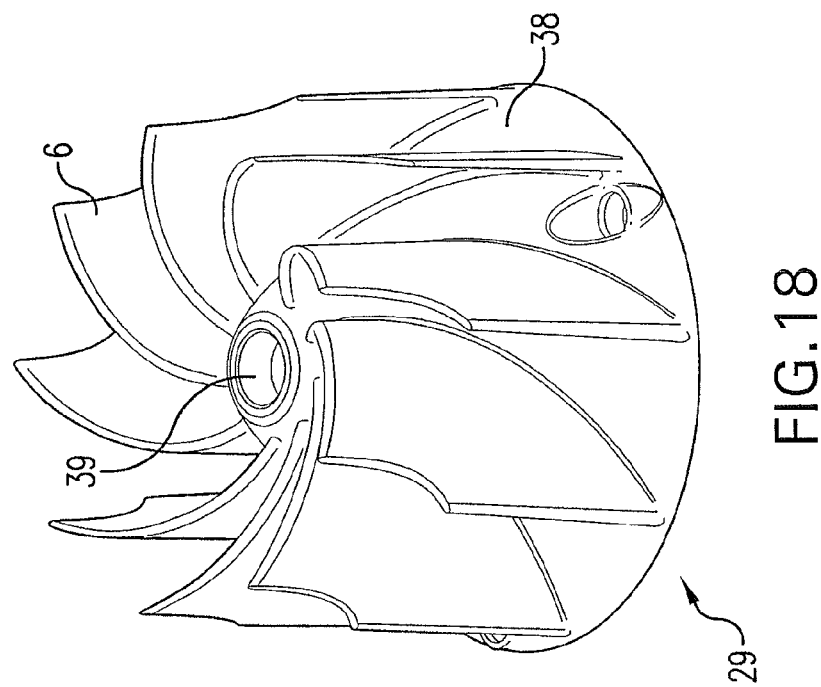

The separator-ejector chamber 26, FIGS. 16 and 17, attaches to the bottom of the motor controller assembly allowing for a smooth transition of the rotating airflow into the separator chamber. The airborne debris is pressed firmly against the inside of the chamber wall following the airflow pattern until it reaches the ejector port 5 at the lower end of the chamber where it is ejected back into the environment. The airflow that has been stripped of most of the debris, in the innermost orbits of the stratified rotating flow within the single stage separator-ejector chamber, flows past the de-swirl blades 6 and through the clean air outlet 3 of the system to the downstream device, such as an internal combustion engine or ventilation system, connected to the outlet 3 of the powered air cleaning system. The de-swirl blades 6 extend axially, in the direction of axis A-A and toward the outlet 3, and are concavely curved, radially, with respect to the rotating flow of the air in the separator-ejector chamber 26. The de-swirl hub 38 tapers with its diameter decreasing in the flow-direction of the outlet. This configuration of the de-swirl end cap 29 redirects the rotating clean air in the inner most orbits of the rotating flow in the chamber in the direction of the outlet to facilitate maintaining a positive air pressure at the outlet across a range of operating speeds of the fan.

Figure 21:
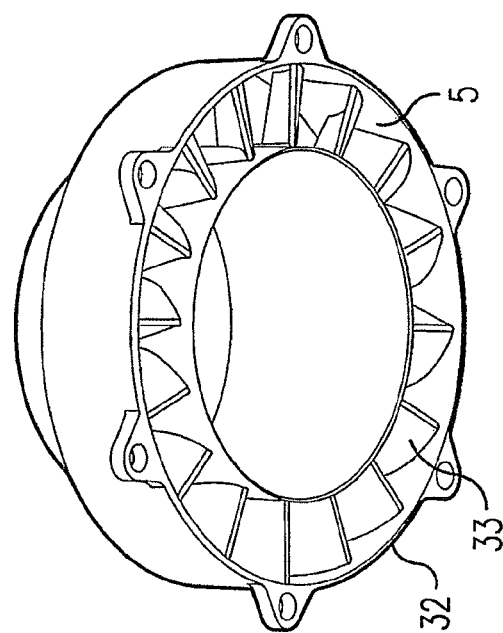
Figure 20:
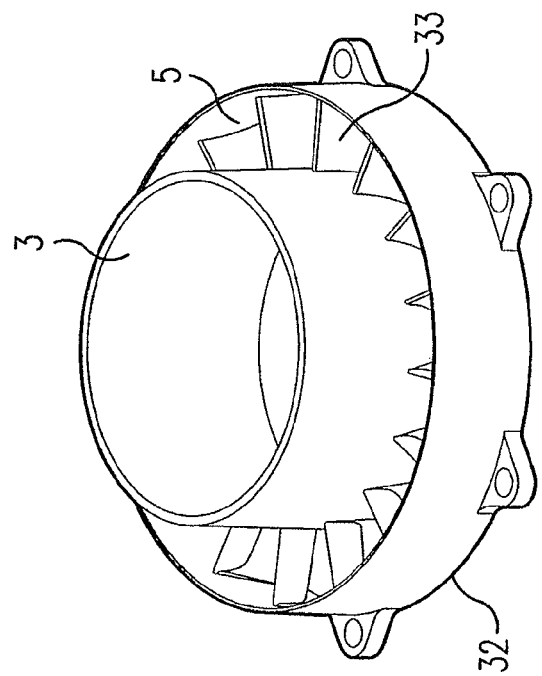
Figure 25:
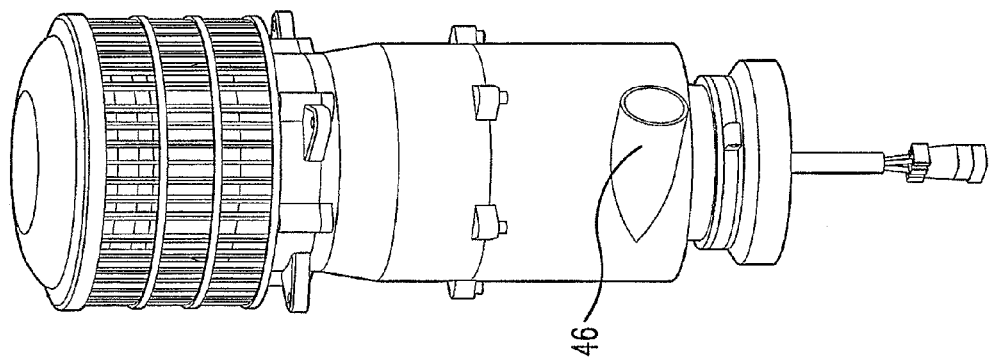
Figure 24:
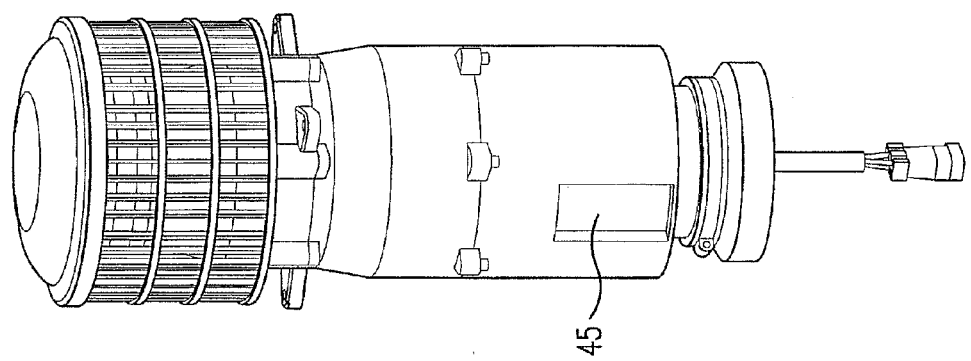

The outlet 3 and ejector port 5 in the example embodiment are part of an outlet assembly 32, see FIGS. 20 and 21 wherein it can be seen that the ejector port is in the end wall of the separator-ejector chamber formed 360° around the clean air outlet 3 with spaced vanes 33 in the ejector port for directing the debris laden air back into the environment. In another form of the separator-ejector chamber, the debris laden air could be ejected through an ejection port in the form of a side slot, 45 in FIG. 24, in the side wall of the chamber adjacent the downstream end wall of the chamber. In such case, the end wall is closed and forms a catch tray about the clean outlet 3 for directing the debris laden air to the side slot ejection port 45 in the wall of the chamber. Instead of a slot in the side wall of the chamber, the debris ejection port could be in the form of a round ejection port in the side wall of the chamber adjacent the downstream end of the chamber connected to a conduit 46 in FIG. 25 for conveying the debris laden air away from sensitive pieces of equipment before disposing of it/returning it to the atmosphere.

During operation of the system 1, the fan 4 rotates clockwise, in the direction D in FIG. 1, and from the arrows B, B' and B" in FIG. 1 it can be seen that debris laden air enters through the open areas of the air inlet screen 7 where it is directed in a vertical direction toward the rain cap 8. Debris laden air is then redirected 180°, following a path defined by the curved inside geometry of the rain cap component. The air now traveling in a downward motion is captured by the system inlet 2 which directs the air toward the impeller of the turbine shaped fan blade 14. The impeller spinning at a rate of 7000 rpm, accelerates the debris laden air and forces the air and debris downward through the stator blades 41 of compression assembly 16 in a rotational pattern. As the air passes the stator blades, it is further accelerated, and the air's rotational pattern is further enhanced. The debris laden air, now traveling with high velocity in a rotational pattern enters the debris separator-ejector chamber 26. The rotational pattern of the air forces the debris toward the outside wall of the chamber. The debris remains "pinned" to the outside wall of the chamber as it travels downward toward the ejector port 5. The debris laden air passes through the ejector port blades, where the blades/vanes 33, FIG. 20, accelerate it and eject it into the atmosphere. Clean air from the innermost orbits of the stratified rotating flow within the chamber enters the de-swirl component, between the blades 6. As the clean air makes contact with the de-swirl blades, which act as stator component blades, its rotational pattern is reduced as the clean air is directed downward toward the outlet 3 and into the inlet of the device on which the system is installed.

The powered air cleaning system 1 is shown in FIG. 23 installed on a device 34 having variable airflow requirements. For example, the device could be an internal combustion engine having variable airflow requirements during operation of the engine, or the device could be an air inlet of a ventilation system having a constant or variable airflow requirements during operation of the ventilation system. The device 34 includes a means 35 for signaling the controller 24 of the air cleaning system 1 of the air flow requirements of the device 34 for varying the speed of the motor-driven fan 4 of the system and thereby the flow rate of clean air through the outlet 3 to the air inlet of the device in accordance with the airflow requirements. The means 35 could be an on/off indicator to signal operating and non-operating states of the device to the controller of the system for operating the system to supply clean air at a constant or variable programmed rate from the system to the device. Alternatively, the means 35 could be an engine speed sensor sensing the rpm of an internal combustion engine to permit the system to supply clean air in direct proportion to the engine operating speed. Or, more simply, the input signal to the controller could be a simple one power setting signal that starts and stops the fan motor of the system. With this simple signal the system is turned off or on based on the signal. When on, it would operate at maximum power requirement or maximum airflow. When the signal was turned off the power would go to zero and the system would turn off. When a more sophisticated onboard computer is used on the internal combustion engine/device 34, such as found on most modern engines, as noted above the computer could be employed to give multiple signals to the controller of the air cleaning system 1. These signals would allow the system to vary its power usage and its corresponding airflow to provide just the right amount of airflow for high-efficiency cleaning of the air being supplied to the engine to meet the engine requirements. The system provides a high cleaning efficiency and the positive pressure of the clean air at the outlet 3 of the system eliminates the normal restriction created by the engine's plumbing and air filter assembly and extends the filter change interval.

When used to supply clean air to a ventilation system, when used in conjunction with modern pressure sensors as referred to above, the system has the ability to provide a stable amount of fresh air into a heating, ventilating and air conditioning (HVAC) system. The system of the invention will clean the air being supplied to a high degree and will increase incoming airflow as means 35, pressure sensors, for example, indicate loss of pressurization or debris buildup on a fresh air filter in the HVAC system. When employed for the ventilation system of a vehicle or equipment cab, this means that the cab pressure required can be preset. When the sensors indicate that the pressure is dropping below the preset requirement, a signal is sent to the motor controller of the system 1 to increase the power to the motor of the system and in turn increase the fan speed. The higher fan speed will deliver more airflow to the filter and into the operator cab. This has the effect of increasing the cab pressurization back to the pre-set level. The net effect is that the fresh air filter in the ventilation system will last longer and hold more debris, while the operator cab will maintain its pressurization for much longer durations of time.

Figure 22:
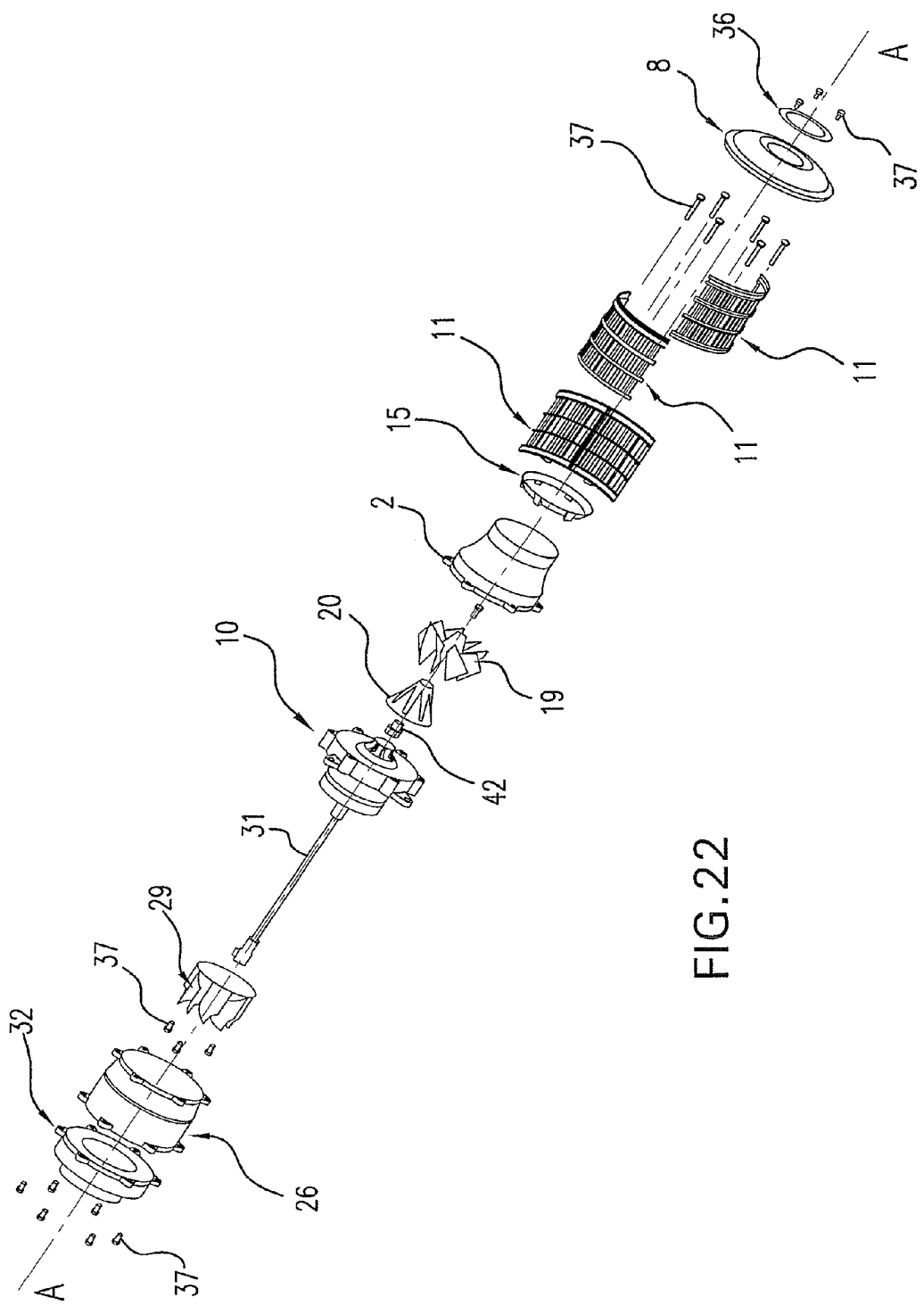

The components of the system 1 in the example embodiment are preferably injection molded of plastic except for the center housing and the compression assembly of the motor controller assembly, which are formed of aluminum as noted above, and except for the electric motor of the motor-driven fan and electronic controller and the fasteners (metal) joining the components. The various parts of the system are joined using the connectors and fasteners shown in the assembly of FIG. 22 and in the various drawings as will be apparent by the skilled artisan. The specifics in this regard are not limiting as other materials and assembly techniques can be employed as will be readily apparent to the skilled artisan.

The powered air cleaning system 1' in FIG. 26 is like the system 1 described above and shown in FIGS. 1-25 except that an additional air inlet piping 47 is connected to the inlet 2 for directing incoming debris laden air to the system under the vehicle hood in lieu of using the air inlet screen 7 with rain cap 8 and top cap 36 and special inlet cap 15 as in the above the hood arrangement shown in FIGS. 1-25. The ejector port of the system 1' shown in FIG. 26 is like ejector port 5 in system 1 but alternatively the system 1' could be provided with an ejection portion in the form of a side slot, like that shown at 45 in FIG. 24, or with a conduit like that shown in 46 in FIG. 25.

Figure 27:
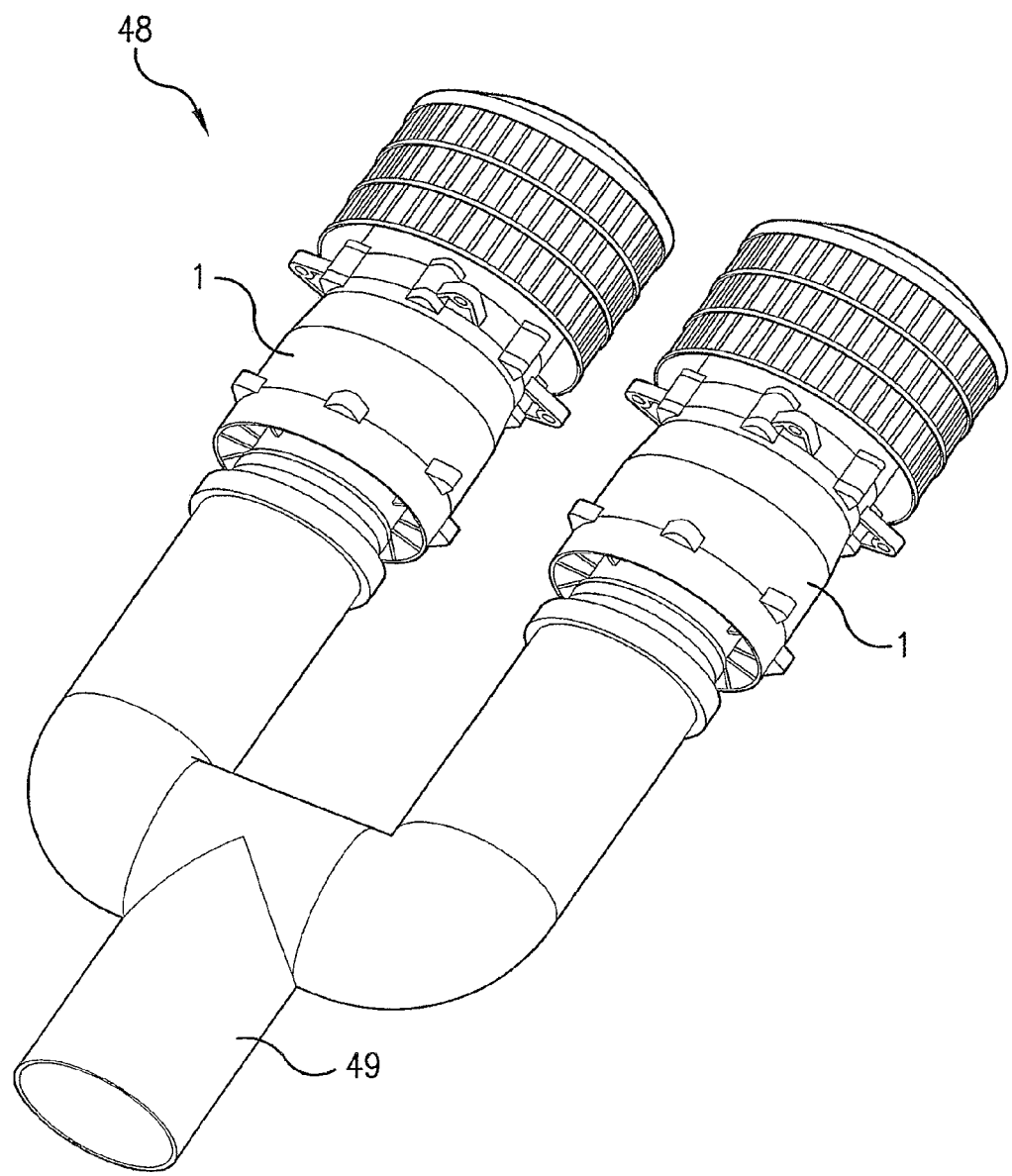

The powered air cleaning arrangement 48 of the invention shown in FIG. 27 employs multiple units, e.g. two systems 1 like that in FIG. 1, whose clean air outlets are each connected to a common clean air inlet piping 49 of a device. Use of multiple units/systems of the invention connected to a common inlet of a device affords an increase in the maximum clean air flow rate to the device.

While we have shown and described only one embodiment in accordance with the present invention, it is understood that the same is not limited thereto, but is susceptible to numerous changes and modifications as known to the those skilled in the art. Therefore, we do not wish to be limited to the details shown and described herein, but instead to over all such changes and modifications as are encompassed by the scope of the appended claims.

The invention claimed is:

1. A powered air cleaning system comprising:
a flow path extending through the system from an inlet to an outlet,
an motor-driven fan located along the flow path to draw particulate debris laden air into the inlet and rotate it about an axis to form a rotating flow that stratifies the debris laden air with the heaviest particles in the outermost orbits of the rotating flow,
a separator-ejector chamber in the flow path downstream of the motor-driven fan, the outermost orbits of the rotating flow riding on an outer wall of the separator-ejector chamber, the separator-ejector chamber having an ejector port for ejecting particulate debris laden air from the stratified rotating flow,
at least one de-swirl blade located within the rotating flow in the chamber for redirecting clean air from the innermost orbits of the stratified rotating flow along the flow path centrally through an axial end of the chamber to the outlet.

2. A powered air cleaning system for supplying clean air from an outlet of the system to a device with which the system is used, the system comprising:
a flow path extending through the system from an inlet to an outlet,
a motor-driven fan located along the flow path to draw particulate debris laden air into the inlet and rotate it about an axis to form a rotating flow that stratifies the debris laden air with the heaviest particles in the outermost orbits of the rotating flow,
a compression assembly located along the flow path downstream of the fan, the compression assembly including a plurality of stationary vanes in the flow path for compressing the volume of the rotating flow of debris laden air to increase the air velocity and centrifugal force acting on the airborne particles,
an ejector port for ejecting particulate debris laden air from the stratified rotating flow in the system,
means for redirecting clean air from the innermost orbits of the stratified rotating flow along the axis to the outlet,
wherein the motor-driven fan includes a variable speed motor and an integrated controller for adjusting the speed of the motor.

3. A powered air cleaning system for supplying clean air to an internal combustion engine having variable airflow requirements during operation of the engine, the air cleaning system comprising:
a flow path extending through the air cleaning system from an inlet to an outlet for supplying clean air to an internal combustion engine,
a motor-driven fan located along the flow path to draw particulate debris laden air into the inlet and rotate it about an axis for forming a rotating flow that stratifies the debris laden air with the heaviest particles in the outermost orbits of the rotating flow,
a separator-ejector chamber in the flow path downstream of the motor-driven fan, the outermost orbits of the rotating flow riding on an outer wall of the separator-ejector chamber, the chamber including an ejector port for ejecting particulate debris laden air from the stratified rotating flow in the system and an axial end through which clean air from the innermost orbits of the stratified rotating flow is redirected centrally along the flow path to an axial end of the chamber and to the outlet,
wherein the motor-driven fan includes a variable speed motor and an integrated controller for adjusting the speed of the motor, and
wherein means are provided for signaling the controller as a function of an operating condition of an engine being supplied with clean air from the system, the operating condition being related to a requirement for air flow from the system, the controller varying the speed of the motor for maintaining separation efficiency in the separator-ejector chamber.

4. A powered air cleaning system for supplying clean air to a ventilation system having an airflow requirement during operation of the ventilation system, the air cleaning system comprising:
a flow path extending through the air cleaning system from an inlet to an outlet for supplying clean air to a ventilation system having variable airflow requirements,
a motor-driven fan located along the flow path to draw particulate debris laden air into the air cleaning system inlet and rotate it about an axis for forming a rotating flow that stratifies the debris laden air with the heaviest particles in the outermost orbits of the rotating flow,
a separator-ejector chamber in the flow path downstream of the motor-driven fan, the outermost orbits of the rotating flow riding on an outer wall of the separator-ejector chamber, the chamber including an ejector port for ejecting particulate debris laden air from the stratified rotating flow in the chamber, and an axial end through which clean air from the innermost orbits of the stratified rotating flow is redirected centrally from the flow path to an axial end of the chamber and to the outlet,
wherein the motor driven fan includes a variable speed motor and an integrated controller for adjusting the speed of the motor, and
wherein means are provided for signaling the controller as a function of an operating condition of a ventilation system being supplied with clean air from the system, the operating condition being related to a requirement for air flow from the system, the controller varying the speed of the motor for maintaining separation efficiency in the separator-ejector chamber.

* * * * *